United States Patent
Aritake et al.

(10) Patent No.: US 6,499,256 B1
(45) Date of Patent: Dec. 31, 2002

(54) WEATHER STRIP

(75) Inventors: Masanori Aritake, Ichinomiya (JP); Hironobu Shigematsu, Ichihara (JP); Nobuhiro Natsuyama, Ichihara (JP)

(73) Assignees: Toyoda Gosei Co., Ltd., Aichi-ken (JP); Sumitomo Chemical Co., Limited, Osaka (JP)

( * ) Notice: Subject to any disclaimer, the term of this patent is extended or adjusted under 35 U.S.C. 154(b) by 0 days.

(21) Appl. No.: 09/365,752

(22) Filed: Aug. 3, 1999

(30) Foreign Application Priority Data

Aug. 4, 1998 (JP) .......................................... 10-233615

(51) Int. Cl.⁷ .............................. B32B 3/00; E06B 7/16
(52) U.S. Cl. .......................... 49/441; 49/440; 49/475.1; 49/490.1; 49/495.1; 428/143; 428/147; 428/323; 428/324; 428/327; 428/57; 428/330; 428/409
(58) Field of Search ................................ 428/323, 330, 428/324, 327, 521, 523, 57, 48, 143, 147, 409; 49/440, 475.1, 441, 479.1, 490.1, 495.1

(56) References Cited

U.S. PATENT DOCUMENTS

| | | | |
|---|---|---|---|
| 4,442,156 A | 4/1984 | Yamaguchi | 428/142 |
| 4,572,872 A | 2/1986 | Yamazaki et al. | 428/423.1 |
| RE32,757 E | 9/1988 | Yamazaki et al. | 428/423.1 |
| 4,894,953 A | 1/1990 | Nozaki | 49/440 |
| 5,183,613 A * | 2/1993 | Edwards | 264/171 |
| 5,265,377 A | 11/1993 | Iwasa et al | 49/441 |
| 5,354,594 A | 10/1994 | Naito et al | 428/122 |
| 5,447,671 A | 9/1995 | Kato et al. | 264/148 |
| 5,610,254 A * | 3/1997 | Sagane et al. | 526/282 |
| 5,623,008 A | 4/1997 | Fujiwara et al. | 524/114 |
| 6,146,739 A * | 11/2000 | Itoh et al. | 428/122 |

FOREIGN PATENT DOCUMENTS

| | | |
|---|---|---|
| DE | 34 42 840 A1 | 6/1985 |
| DE | 35 03 479 A1 | 8/1985 |
| DE | 42 02 475 A1 | 7/1992 |
| EP | 533 415 A2 | 3/1993 |
| JP | 9-48882 | 2/1997 |
| JP | 10-101853 | 4/1998 |

* cited by examiner

Primary Examiner—Paul Thibodeau
Assistant Examiner—Monique Jackson
(74) Attorney, Agent, or Firm—Pillsbury Winthrop LLP

(57) ABSTRACT

A weather strip comprises an extruded part and a molded part which is connected to the extruded part. The molded part is molded from a material containing a solid particle antifriction material and has 1 to 50 μm of ten points average surface roughness (Rz) on the surface of the molded part. The material is a thermoplastic elastomer or a soft resin.

6 Claims, 5 Drawing Sheets

WEATHER STRIP

BACKGROUND OF THE INVENTION

1. Field of the Invention

This invention relates to a weather strip including a glass run and a door weather strip for an automobile.

2. Description of Related Art

A conventional glass run 50 is shown in FIGS. 6 to 8. The glass run 50 is attached to a door sash 1 of an automobile (see FIG. 5) and seals between the outer peripheral edge of a raised door window glass 2 and the door sash 1. The glass run 50 comprises a plurality of straight extruded parts 51 and curved or bent molded parts 61, each of which connects together two of the straight extruded parts 51. The extruded part 51 is attached to a straight section of the door sash 1 while the molded part 61 is attached to a corner section of the door sash 1. The letter "S" designates a borderline, or the connected end surfaces, between the extruded part 51 and the molded part 61.

The extruded part 51 shown in FIG. 7 comprises a channel portion 54 which consists of a bottom portion 52 and two side walls 53, and two seal lips 55 which project into the channel portion 54 from free ends of the both side walls 53 respectively. The molded part 61 shown in FIG. 8 comprises a channel portion 64 which consists of a bottom portion 62 and two side walls 63, and two seal lips 65 which project into the channel portion 64 from free ends of the both side walls 63 respectively.

Recently, attention is paid to a thermoplastic elastomer (TPE) which is superior to a rubber at the molding process. The extruded part 51 has also come to be formed from an olefin-based TPE (TPO) by extrusion molding. The molded part 61, which connects extruded parts 51 made of the TPO, is molded from a TPO or an olefin resin, either of which has high compatibility (adhesivity) to the TPO.

The end face of the outer peripheral edge of the door window glass 2 slides on the surfaces of the bottom portions 52, 62, while both side surfaces of the outer peripheral edge of the door window glass 2 slide on the surfaces of the seal lips 55, 65 respectively. Therefore, it is required to lower the frictional resistance of the surfaces of the bottom portions and seal lips to thereby enhance their slidability, and to prevent abrasion of the surfaces for improving their durability.

To meet these requirements, low-friction layers 57 made of a polyethylene resin, which have a low coefficient of friction and an excellent abrasion resistance, are formed on the surfaces of the bottom portion 52 and the seal lips 55 made of the TPO by co-extrusion simultaneously when the channel portion 54 and the seal lips 55 are formed by extrusion molding to form the extruded part 51 as a single product, as shown in FIG. 7.

As for the molded part 61 made of the TPO or the olefin resin, however, it was difficult to form the low-friction layer 57 on the surfaces of the bottom portion 62 of the channel portion 64 and the seal lips 65 when the molded part 61 was formed by injection molding as a single product, using substantially same technique of the above-described extruded part 51 forming technique, namely, simultaneously molding of the low-friction layers 57 and the channel portion 54, as shown in FIG. 8. Therefore, one could do nothing but apply liquid low-friction coating 67 made of a silicone oil or a polyurethane coating on the surfaces of the bottom portion 62 and the seal lips 65 after the molded part 61 is formed, to prevent the abrasion of the surfaces. However, the surfaces only with the liquid low-friction coating 67 were inferior to those with the above low-friction layers 57 especially in durability. Because, even if the liquid low-friction coating 67 can improve the initial slidability of the surfaces, they gradually disappear as they are used, which gradually lowers the slidability.

SUMMARY OF THE INVENTION

It is an object of this invention to provide a weather strip, which can improve the slidability and durability of the molded part.

The present invention resides in a weather strip comprising a molded part connected to an extruded part, wherein the molded part is molded from a thermoplastic elastomer or a soft resin containing a solid particle antifriction material and has 1 to 50 μm of ten points average surface roughness (Rz) on the surface of the molded part. "Ten points average surface roughness" is a value measured in accordance with JIS B0651, JIS B0601, ISO 4287/1, ISO 4287/2, ISO4288.

Here, the molding method is not limited to a specific one. For example, cast molding, compression molding, transfer molding or injection molding can be employed.

Though "TPE" is not limited to a specific type, it embraces an olefin-based TPE (TPO), a styrene-based TPE (SBC) and a polyester-based TPE (TPEE). The TPE having high compatibility to the extruded part is preferably used. For example, the TPO is preferably used when the extruded part is made of a TPO or an ethylene-propylene-diene copolymer (EPDM) rubber.

Though "soft resin" is not limited to a specific type, it embraces an olefin soft resin and a polyurethane resin (PU), a resin having high compatibility to the extruded part is preferably used. For example, an olefin soft resin is preferably used when the extruded part is made of a TPO or an EPDM rubber. The olefin soft resin embraces a soft polyethylene resin and an ethylene vinyl acetate resin (EVA).

"Solid particle antifriction material" is not limited to a specific type, and it may be an antifriction material formed of solid particles of at least one material selected from the group consisting of a silicone resin, a polyamide resin, a fluorine resin, a polycarbonate resin, a mica, a molybdenum and a calcium carbonate.

The content of the solid particle antifriction material is not specifically limited, and 1 to 30% by weight for the total weight of the molding material including the antifriction material itself is preferable. Moreover, the particle size of the solid particle which forms the antifriction material is not specifically limited, and 0.1 to 50 μm is preferable.

The reason why the ten points average surface roughness (Rz) on the surface of the molded part is restricted to 1 to 50 μm is that the ten points average surface roughness less than 1 μm lowers the effect of improving slidability of the molded part, while the ten points average surface roughness more than 50 μm deteriorates the outward appearance of the molded part. 10 to 30 μm of the ten points average surface roughness is more preferable. Even if the particle size of a solid particle is, for instance, 0.1 μm or 1 μm, the ten points average surface roughness can be, for instance, 1 μm or 10 μm, since a plurality of solid particles often cluster together.

The TPE or the soft resin can further contain a liquid antifriction material. The liquid antifriction material is not limited to a specific type, and it embraces a silicone oil such as polydimethylsiloxane. 0.1 to 10% by weight of the liquid antifriction material is preferably contained for the total weight of the molding material including the antifriction material itself.

The extruded part is preferably formed from a TPE or a rubber by extrusion molding, and one formed from a TPO or an EPDM rubber is more preferable.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrative and not seen to limit the scope of the invention.

DETAILED DESCRIPTION OF THE PREFERRED EMBODIMENTS

Figure 1:
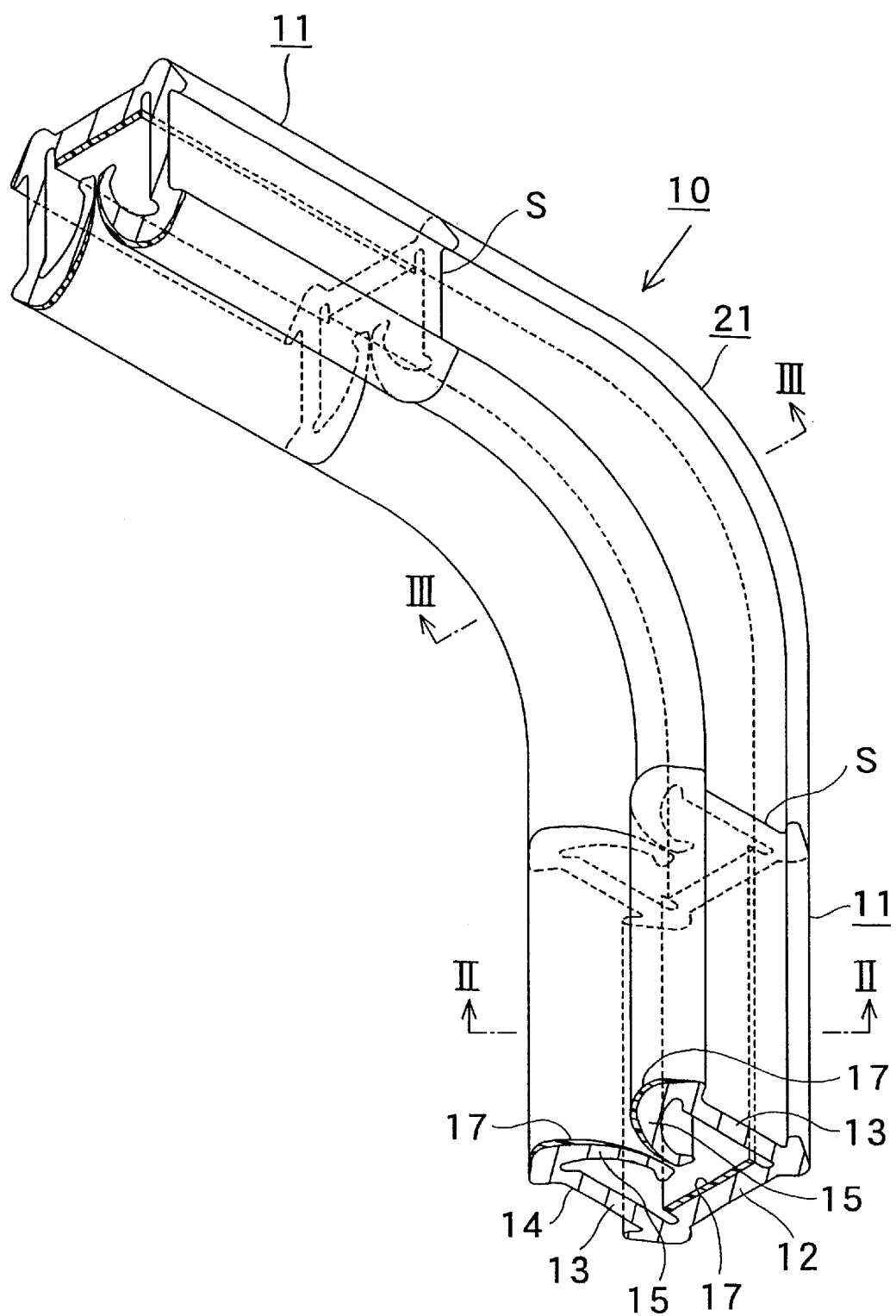
FIG. 1 is a perspective view showing a glass run of an embodiment of the present invention.

A glass run 10 of an embodiment of this invention is shown in FIGS. 1 to 4. The glass run 10, attached to a door sash 1 of an automobile (see FIG. 5), seals between the outer peripheral edge of a raised door window glass 2 and the door sash 1. This glass run 10 comprises a plurality of straight extruded parts 11, parts of which are shown in FIG. 1, and curved or bent molded parts 21, each of which connects together two of the straight extruded parts 11. The straight extruded part 11 is attached to a straight section of the door sash 1, while the curved molded part 21 is attached to follow a corner section of the door sash 1. The letter "S" designates a borderline, or the connected end surfaces, between the extruded part 11 and the curved molded part 21.

Figure 2:
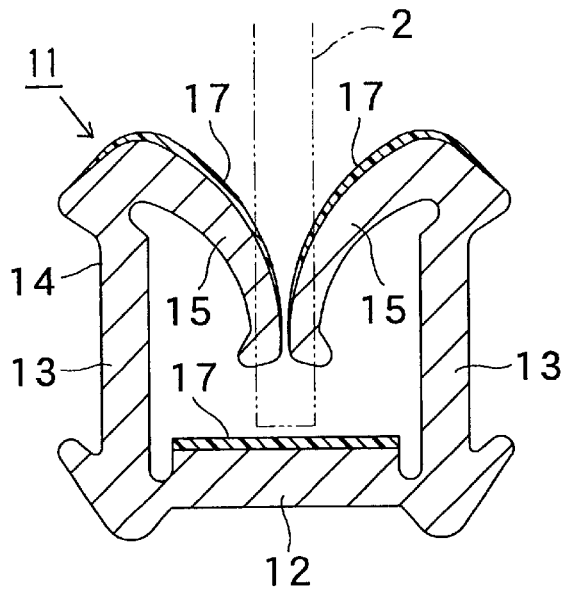
FIG. 2 is a sectional view taken along the line II—II in FIG. 1.
Figure 3:
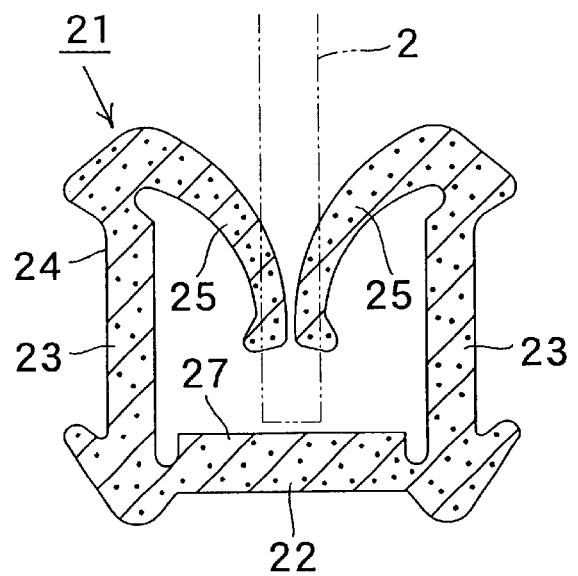
FIG. 3 is a sectional view taken along the line III—III in FIG. 1.

The extruded part 11, the cross-section of which is shown in FIG. 2, comprises a channel portion 14 which includes a bottom portion 12 and two side walls 13, and two seal lips 15 which project into the channel portion 14 from free ends of the both side walls 13 respectively. The curved molded part 21 shown in FIG. 3 comprises a channel portion 24 which includes a bottom portion 22 and two side walls 23, and two seal lips 25 which project into the channel portion 24 from free ends of the both side walls 23 respectively. The extruded part 11 further comprises low-friction layers 17, which have a low coefficient of friction and an excellent abrasion resistance, and which are formed on the surface of the bottom portion 12 and the surfaces of the seal lips 15.

The extruded part 11 is formed by co-extrusion from a TPO, which forms the channel portion 14 and seal lips 15, and another type TPO or a polyethylene resin, which forms the low-friction layers 17. Therefore, the number of manufacturing processes can be decreased, and the cost of manufacturing can be reduced.

The channel portion 24 and the seal lips 25 are molded from a TPO, whose composition is shown in the column of "Example" in Table 1, to form the molded part 21 as a single product. This TPO is obtained by blending a polypropylene as a hard phase and an ethylene propylene rubber as a soft phase, and has a phase-separated structure in its microstructure. Specifically, the TPO is obtained by melt kneading polypropylene and an ethylene propylene rubber, dynamically crosslinking a blend of polypropylene with an ethylene propylene rubber in the presence of an organic peroxide, or the like. Moreover, predetermined percents by weight of calcium carbonate as a solid particle antifriction material and a silicone oil as a liquid antifriction material are mixed in the TPO, respectively. Composition of the TPO used for the conventional curved molded part 61 is shown in the column of "Comparative Example" in Table 1, for comparison with this invention.

TABLE 1

| Material | Comparative Example (wt %) | Example (wt %) |
|---|---|---|
| Polypropylene (PP) | 10~30 | 10~30 |
| Ethylene propylene rubber (EPR) | 40~60 | 40~60 |
| Additive such as process oil | 20~30 | 10~20 |
| Solid particle antifriction material (calcium carbonate) | — | 1~10 |
| Liquid antifriction material (silicone oil) | — | 0~5 |

The molding process, first, ends of two extruded parts 11 are mounted in a mold (not shown). Then, the above Example TPO is injected into the mold cavity (an injection molding technique is preferably employed here) to thereby form the molded part 21. Simultaneously with this molding, end surfaces of the extruded parts 11 are connected to the resulting molded part 21. Since both parts 11, 21 are formed from olefin type material and have high compatibility (adhesivity) to each other, they are firmly connected.

The end face of the outer peripheral edge of the door window glass 2 slides on the surfaces of the bottom portions 12, 22, while both side surfaces of the outer peripheral edge of the door window glass 2 slide on the surfaces of the seal lips 15, 25.

However, since the low-friction layers 17 having a low coefficient of friction and an excellent abrasion resistance are formed on the bottom portion 12 and seal lips 15 of the extruded part 11, the extruded part 11 shows an excellent slidability and durability.

Figure 4:
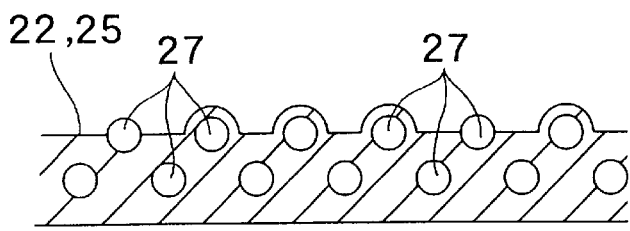
FIG. 4 is a partial enlarged sectional view of FIG. 3.
Figure 5:
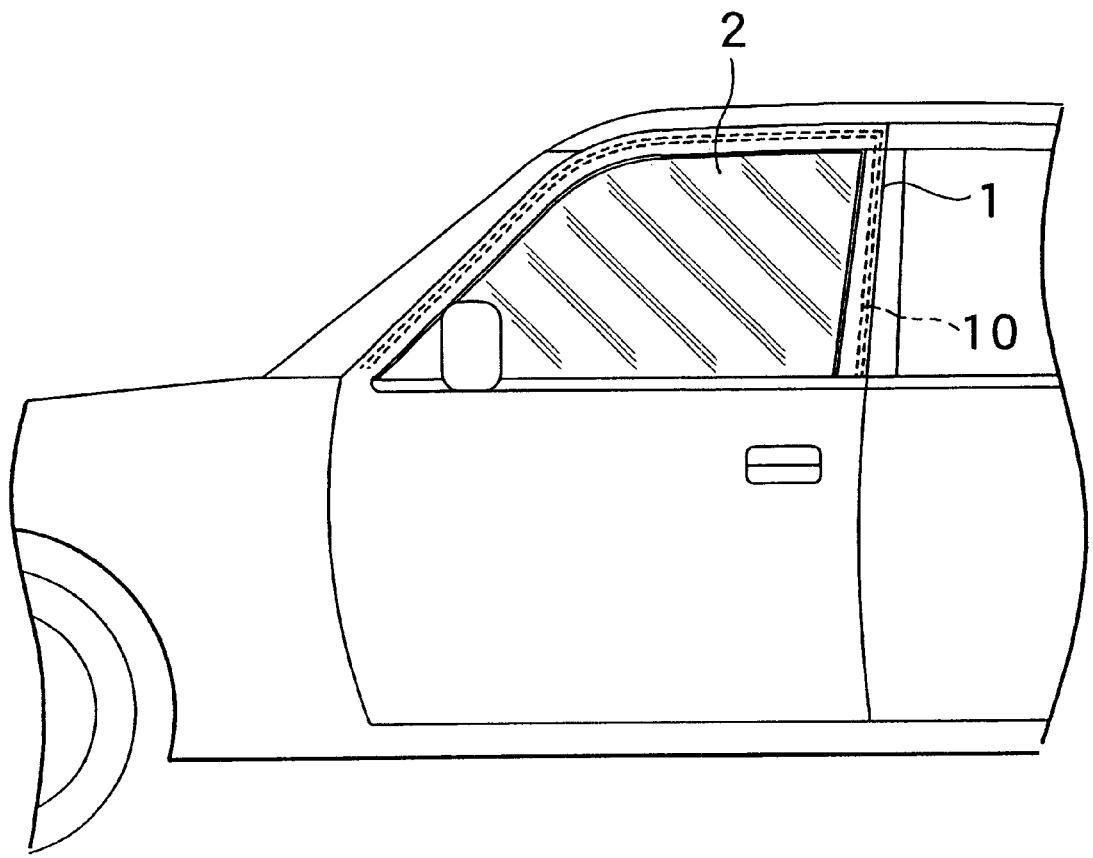
FIG. 5 is a partial side view of an automobile to which the glass run of FIG. 1 is applied.
Figure 6:
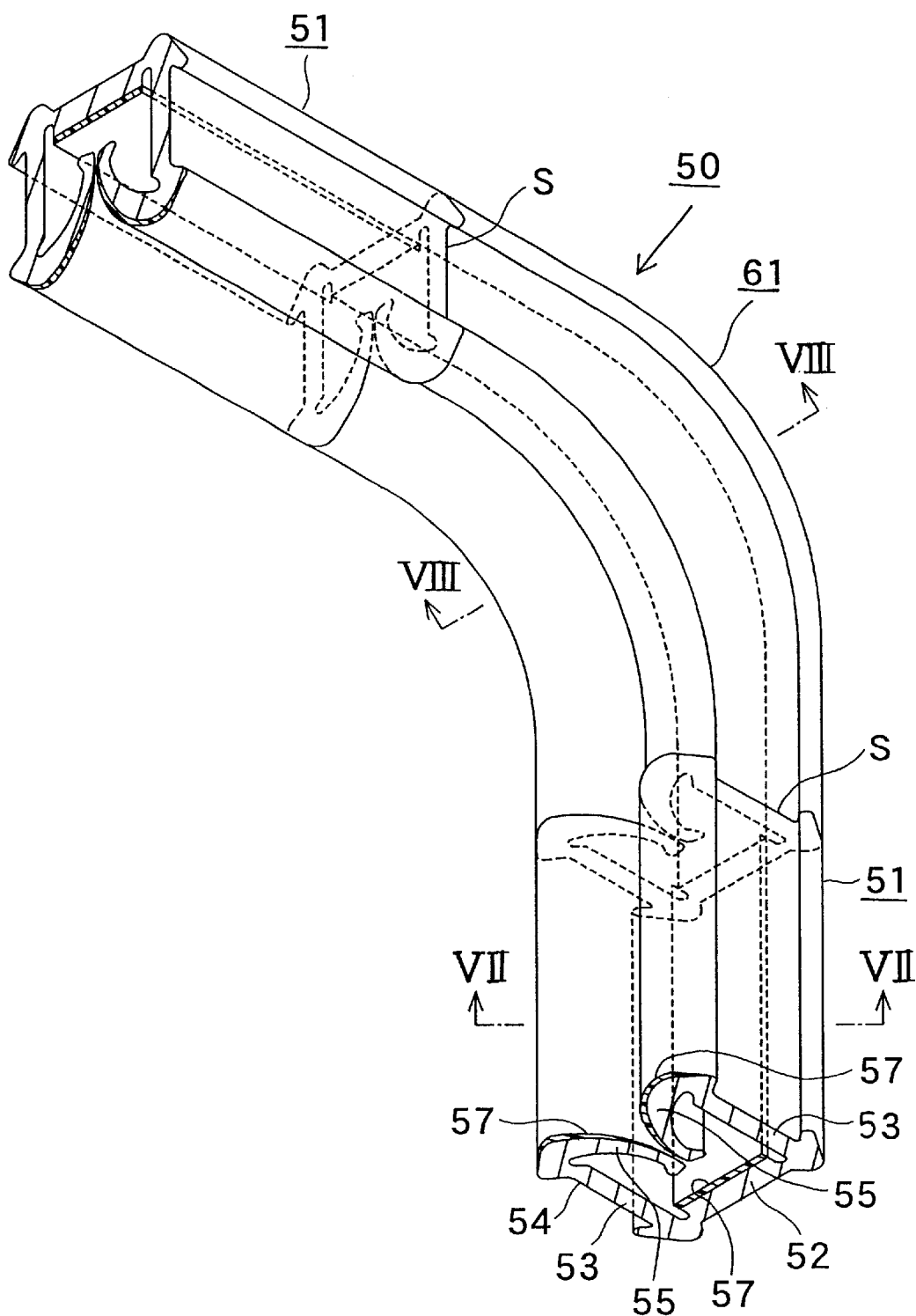
FIG. 6 is a perspective view showing a conventional glass run.
Figure 7:
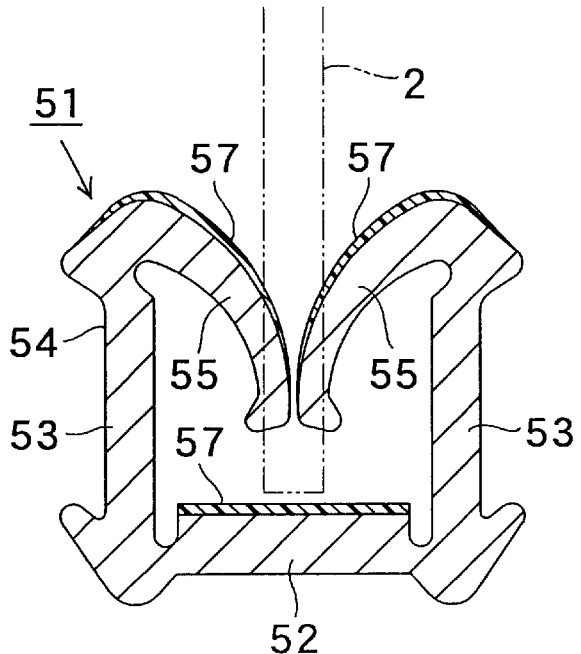
FIG. 7 is a sectional view taken along the line VII—VII in FIG. 6.
Figure 8:
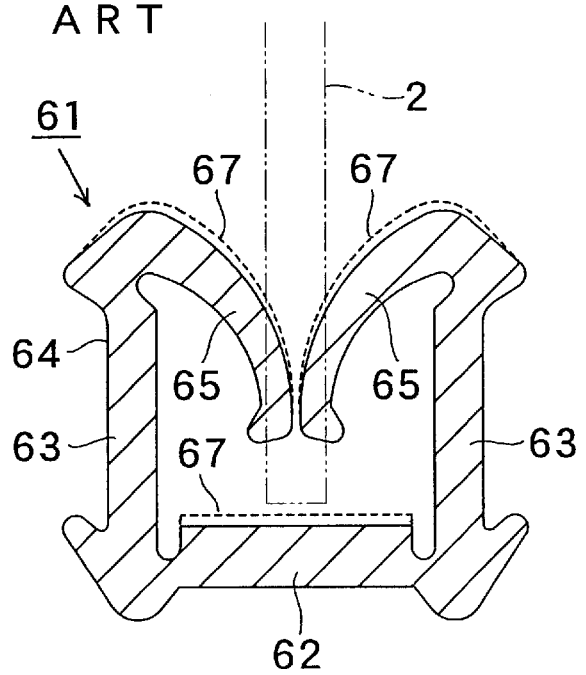
FIG. 8 is a sectional view taken along the line VIII—VIII in FIG. 6.

Further, on each surface of the bottom portion 22 and seal lips 25 of the curved molded part 21, the solid particle antifriction material 27 contained in the TPO upheaves the surface of the TPO to form a minute ruggedness, as notionally shown in the enlarged FIG. 4, to thereby achieve 10 to 30 μm of ten points average surface roughness (Rz). With this microstructure, contacting area of each surface with the door window glass 2 decreases to lower the frictional resistance of the surface, which prevents the surface from adhering to the door window glass 2. Furthermore, a part of the solid particle antifriction material 27 appears on the surface to directly lower the frictional resistance, which effects an excellent slidability and durability of the curved molded part 21.

Moreover, since the minute ruggedness formed on the outer surface of the bottom portion 22 lowers the frictional resistance of the surface, the curved molded part 21 is inserted into the door sash 1 and is well engaged with the door sash 1.

It is to be understood that the foregoing description of the structure with reference to the embodiment is not intended for limiting the scope of this invention, but that variations or modifications may be made without departing from the scope and spirit of this invention. The following is a brief description of a few examples of such modifications.

(1) This invention may be applied to various weather strips other than a glass run, examples of which include a weather strip which is attached to a door, roof side or trunk of an automobile and which has a contacting portion with its counterpart.

(2) The TPE, the soft resin or the solid particle antifriction material may be modified in their type or content.

As many apparently widely different embodiments of this invention may be made without departing from the spirit and scope thereof, it is to be understood that the invention is not limited to the specific embodiments thereof except as defined in the appended claims.

What is claimed is:

1. A weather strip comprising an extruded part and a molded part connected to said extruded part,
    wherein said extruded part is formed by extrusion molding from a thermoplastic elastomer,
    wherein said molded part is molded from an olefin thermoplastic elastomer containing a solid particle antifriction material and has 10 to 50 $\mu$m of ten points average surface roughness (Rz) on the surface of said molded part,
    wherein said solid particle antifriction material constitutes between 1% and 30% by weight of the total weight of said molded part,
    wherein a particle size of said solid particle antifriction material is 0.1 to 50 $\mu$m, and
    wherein said solid particle antifriction material is mixed throughout said molded part.

2. A weather strip as set forth in claim 1, wherein said solid particle antifriction material is at least one selected from the group consisting of silicone resin, polyamide resin, fluorine resin, polycarbonate resin, mica, molybdenum and calcium carbonate.

3. A weather strip as set forth in claim 1, wherein said material further contains a liquid antifriction material.

4. A weather strip according to claim 1,
    wherein the weather strip comprises a glass run;
    and wherein the extruded part comprises
        a channel portion, the channel portion comprising
            a bottom portion and
            two side walls,
        two seal lips, which project into the channel portion from free ends of the side walls respectively, and
        low-friction layers formed on an interior surface of the bottom portion and an exterior surface of the seal lips;
    the extruded part having been formed by coextruding a first TPO to form the channel portion and seal lips, and a second material to form the low friction layers, the second material comprising a different TPO or a polyethylene resin;
    and wherein the molded part comprises
        a channel portion comprising
            a bottom portion and
            two side walls,
        and two seal lips, which project into the channel portion from free ends of the side walls respectively,
        the channel portion and the seal lips of the molded part comprising a single TPO, wherein an interior surface of the channel portion and exterior surfaces of the seal lips of the molded part further comprise the single TPO,
    wherein the content of the solid particle antifriction material is 1 to 30% by weight for the total weight of said material including said antifriction material;
    and wherein a particle size of the solid particle antifriction material is 0.1 to 50 $\mu$m.

5. A weather strip as set forth in claim 4, wherein said solid particle antifriction material comprises at least one material selected from the group consisting of silicon resin, polyamide resin, fluorine resin, polycarbonate resin, mica, molybdenum and calcium carbonate.

6. A weather strip as set forth in claim 4, wherein the molded part further comprises a liquid antifriction material.

* * * * *